(12) United States Patent
Poling

(10) Patent No.: US 8,972,726 B1
(45) Date of Patent: Mar. 3, 2015

(54) SYSTEM AND METHOD FOR DIGITAL RIGHTS MANAGEMENT USING A SECURE END-TO-END PROTOCOL WITH EMBEDDED ENCRYPTION KEYS

(75) Inventor: Matthew J. Poling, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1180 days.

(21) Appl. No.: 12/548,143

(22) Filed: Aug. 26, 2009

(51) Int. Cl.
*H04L 9/32* (2006.01)

(52) U.S. Cl.
USPC ............... 713/168; 713/170; 726/26; 726/29

(58) Field of Classification Search
None
See application file for complete search history.

(56) References Cited

U.S. PATENT DOCUMENTS

| | | | |
|---|---|---|---|
| 7,051,005 B1 | 5/2006 | Peinado et al. | |
| 7,152,166 B2 | 12/2006 | Strom et al. | |
| 7,155,415 B2 | 12/2006 | Russell et al. | |
| 7,539,875 B1* | 5/2009 | Manferdelli et al. | 713/189 |
| 2003/0084306 A1* | 5/2003 | Abburi et al. | 713/188 |
| 2004/0030741 A1* | 2/2004 | Wolton et al. | 709/202 |
| 2004/0078581 A1* | 4/2004 | Dublish et al. | 713/189 |
| 2004/0230831 A1* | 11/2004 | Spelman et al. | 713/201 |
| 2005/0120201 A1* | 6/2005 | Benaloh et al. | 713/155 |
| 2005/0120210 A1* | 6/2005 | Behbehani | 713/168 |
| 2005/0232415 A1* | 10/2005 | Little et al. | 380/28 |
| 2005/0278787 A1* | 12/2005 | Naslund et al. | 726/26 |
| 2006/0195689 A1* | 8/2006 | Blecken et al. | 713/156 |
| 2007/0067851 A1* | 3/2007 | Fernando et al. | 726/26 |
| 2007/0098157 A1* | 5/2007 | Palkar | 380/37 |
| 2007/0226150 A1* | 9/2007 | Pietrzak et al. | 705/59 |
| 2007/0245414 A1* | 10/2007 | Chan et al. | 726/12 |
| 2009/0006868 A1* | 1/2009 | Alkove et al. | 713/193 |
| 2010/0095132 A1* | 4/2010 | Murray | 713/189 |

OTHER PUBLICATIONS

R. McMillan, "A RESTful approach to Web services," Network World, Published: Feb. 19, 2003, Retrieved: Dec. 26, 2012, Online: [http://www.networkworld.com/ee/2003/eerest.html].*

* cited by examiner

*Primary Examiner* — Jung Kim
*Assistant Examiner* — Robert Leung
(74) *Attorney, Agent, or Firm* — Kilpatrick Townsend & Stockton LLP

(57) ABSTRACT

Various embodiments of a system and method for digital rights management using a secure end-to-end protocol with embedded encryption keys are described. A DRM framework may implement a secure end-to-end protocol configured to protect messages sent between trusted endpoints by encrypting and decrypting the messages within software applications executing on each trusted endpoint. An encryption key embedded within a binary representation of a DRM client may be used by the DRM client to encrypt and decrypt messages sent over the secure protocol. The DRM client may request authentication using the secure protocol and receive an authentication token used by the DRM client to acquire a license to view protected content. The encryption key may be chosen from a pool of encryption keys and embedded in the DRM client during the software build process for the DRM client. The secure protocol may be designed according to Representational State Transfer guidelines.

26 Claims, 6 Drawing Sheets

SYSTEM AND METHOD FOR DIGITAL RIGHTS MANAGEMENT USING A SECURE END-TO-END PROTOCOL WITH EMBEDDED ENCRYPTION KEYS

BACKGROUND

1. Field of the Invention

The present invention is directed to computer systems. More particularly, the invention is directed to digital rights management within a computing environment.

2. Description of the Related Art

In prior years it would not be uncommon for an individual to obtain content (e.g., literary works, periodicals, music, and movies) from a retail location in the form of a physical medium. For example, an individual might travel to a local bookstore and purchase written works in the form of a book, newspaper, or magazine. In another example, an individual might purchase music stored on a Compact Disc (CD) or a motion picture stored on a Digital Video Disc (DVD). In recent years, the ubiquity of the Internet and the World Wide Web has paved the way for alternative methods of obtaining content. For example, a user might log on to a music retailer's website and download a digital version of a music album. In other examples, a user might log on to a movie subscription provider's website to download or stream a motion picture to view on a personal computer. In the case of books, a user might log on to a bookseller's website and download an electronic book ("e-book") for viewing on a computer system, such as a desktop computer or a handheld e-book reader.

The Internet and World Wide Web serve as a backbone for numerous file sharing mechanisms. Examples of such mechanisms include electronic mail ("email") and more advanced file distribution software, such as peer-to-peer ("P2P") file sharing applications. In many cases, such file sharing mechanisms are often utilized to distribute electronic content to individuals that are not authorized to access such content. Such distribution is likely due in part to the relative ease and anonymity of sharing files through such mechanisms. To combat unauthorized consumption of content, some content owners have adopted an approach to protecting their content known as digital rights management ("DRM"), which may include various techniques for limiting access of electronic content to authorized individuals.

Conventional DRM methods for protecting electronic content transmitted across the Internet use the Secure Sockets Layer (SSL) protocol to encrypt data sent between trusted endpoints. The SSL protocol decrypts data at the transport layer within a computer system. Thus, data (i.e., electronic content) is decrypted at the network card within a computer system and travels from the network card through the operating system (OS) to a software application (i.e., a software application configured to consume electronic content) on the system in an unencrypted, unprotected state. While traveling through the OS in an unprotected state, electronic content may be vulnerable to attack by commonly available debugging tools (e.g. the Charles Web Debugging Proxy) which may intercept and alter the transmitted data. Thus, the debugging tool may be used on an end user's system to gain unauthorized access to electronic content.

The SSL protocol traditionally uses public key infrastructure (PKI), which establishes asymmetric public-private key pairs used for message encryption and decryption. Establishing a PKI infrastructure on a user's system in order to limit access to electronic content on the system requires loading the encryption keys and configuring the particular system, which may require significant effort from a user or system administrator. The Simple Object Access Protocol (SOAP) is typically used to define the format and transmission of messages across the Internet. The SOAP protocol uses Extensible Markup Language (XML) to define the SOAP message format. The format defined by XML, along with other requirements of SOAP, can result in lengthy messages with additional overhead beyond the basic information that may be required for tasks such as authenticating a user as a trusted consumer of electronic content.

SUMMARY

Various embodiments of a system and method for digital rights management (DRM) using a secure end-to-end protocol with embedded encryption keys are described. In some embodiments, a DRM framework may implement a secure end-to-end protocol which may include protecting messages sent between trusted endpoints by encrypting and decrypting the messages within software applications executing on each trusted endpoint. The DRM framework may include a DRM client configured to carry out DRM operations such that protected content can be consumed by a client software application. For instance, the DRM client may be responsible for decrypting protected content and enforcing usage rights on such content. In some embodiments, the DRM client may be configured to communicate with other entities of the DRM framework using the secure end-to-end protocol. In some embodiments, the secure end-to-end protocol may be designed according to Representational State Transfer (REST) guidelines.

In some embodiments, an encryption key embedded into the binary representation of the DRM client may be used to encrypt messages sent using the secure end-to-end protocol. The DRM client may be configured to use the secure end-to-end protocol to request authentication from an authentication server. For example, the DRM client may send an encrypted (using the encryption key embedded in the DRM client) authentication request that includes a unique identifier of the binary representation of the DRM client. In some embodiments, the authentication server may use the identifier to look-up an encryption key that matches the encryption key embedded in the DRM client. The authentication server may be configured to use the located encryption key to decrypt the authentication request from the DRM client and encrypt an authentication token sent to the DRM client. In some embodiments, the authentication token provided to the DRM client may identify the DRM client as a trusted consumer of protected content. The DRM client may be configured to use the authentication token in further communication with other entities of the DRM framework. For example, the DRM client may present the authentication token to a content license server as part of a request for a license to view protected content.

In some embodiments, the DRM framework may be configured to perform DRM client diversification by creating unique binary representations of the DRM client. In various embodiments, a unique identifier of an instance of the DRM client and an encryption key may be embedded in the binary representation of the DRM client during the software build process for the DRM client. As such, each binary representation of the DRM client may contain a unique identifier-encryption key pair. The identifier-encryption key pairs may be stored in an encryption key map which may be used by an authentication server to identify the appropriate encryption key for a particular instance of a DRM client. In some embodiments, the encryption key embedded in a binary representation of a DRM client may be selected from a predetermined pool of encryption keys.

Figure 1:
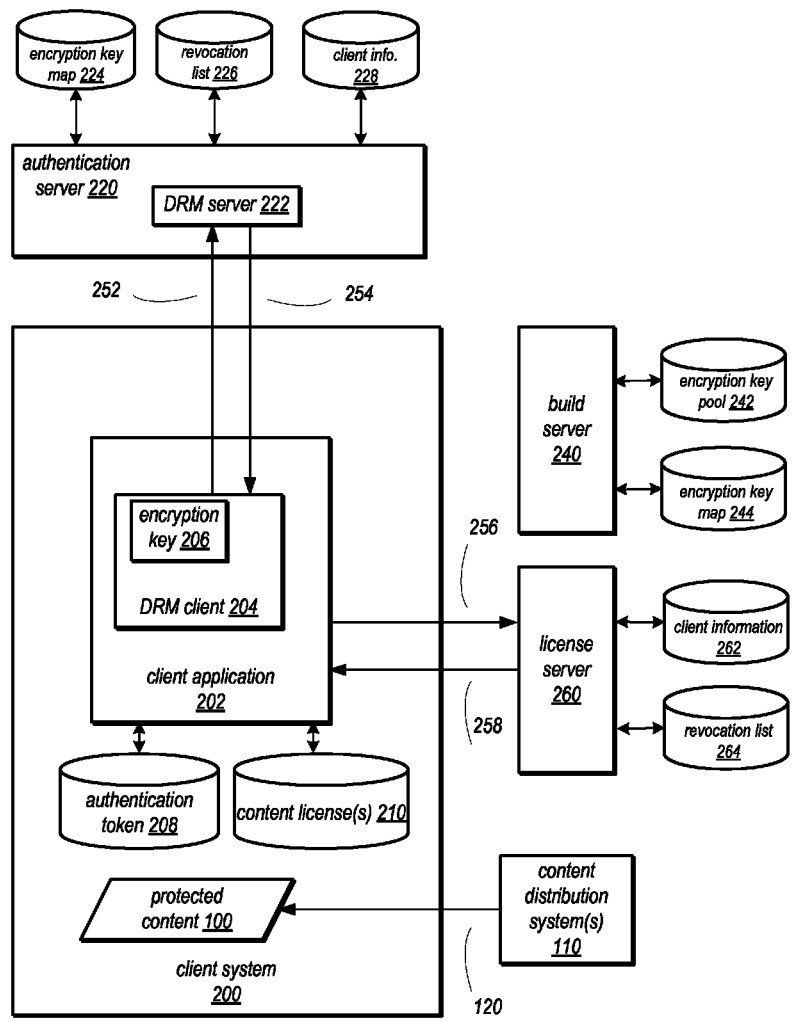
FIG. 1 illustrates a block diagram of a DRM framework of the system and method for digital rights management using a secure end-to-end protocol with embedded encryption key, according to various embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for digital rights management using a secure end-to-end protocol with embedded encryption keys are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments include various encryption and/or decryption keys, any of which may be generated via a key derivation function (KDF). Key derivation functions may include one or more iterations or instances of hash functions and/or other cryptographic operations in order to generate an encryption or decryption key. Examples of key derivation function may include but are not limited to any key derivation functions specified by Public Key Cryptography Standards (PKCS) (e.g., PKCS-5) or Adobe Password Security. In various embodiments, KDFs may be utilized by any of the various components described herein to generate public key-private key pairs.

Various portions of this detailed description may refer to "client(s)" and "server(s)." For instance, various embodiments may include (among other elements) a client system (or simply a "client"), an authentication server, a build server and/or a license server. It should be understood that the terms "client" and "server" do not impose any limitation on the operation, configuration, or implementation of such elements. It should be understood that these terms are used only as convenient nomenclature. Indeed, various embodiments are in no way limited by the principles of a conventional client-server architecture. For instance, any of the "clients" or "servers" described herein may be configured to communicate according to a variety of communication protocols or system architectures, such as a peer-to-peer (P2P) architecture or some other architecture, whether such architecture is presently known or developed in the future.

In various instances, this detailed description may refer to content (which may also be referred to as "content data," "content information" or simply "data" or "information"). In general, content may include any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to Adobe® Flash® Video (.FLV) format or some other video file format whether such format is presently known or developed in the future.

In various embodiments, content may include electronic representations of music, spoken words, or other audio, which may include but is not limited to data files adhering to the MPEG-1 Audio Layer 3 (.MP3) format, Adobe® Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, Adobe® Photoshop® (.PSD) format or some other format for electronically storing text, graphics and/or other information whether such format is presently known or developed in the future. In some embodiments, content may include any combination of the above-described examples.

In various instances, this detailed disclosure may refer to consuming content or to the consumption of content, which may also be referred to as "accessing" content, "viewing" content, "listening" to content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Figure 6:
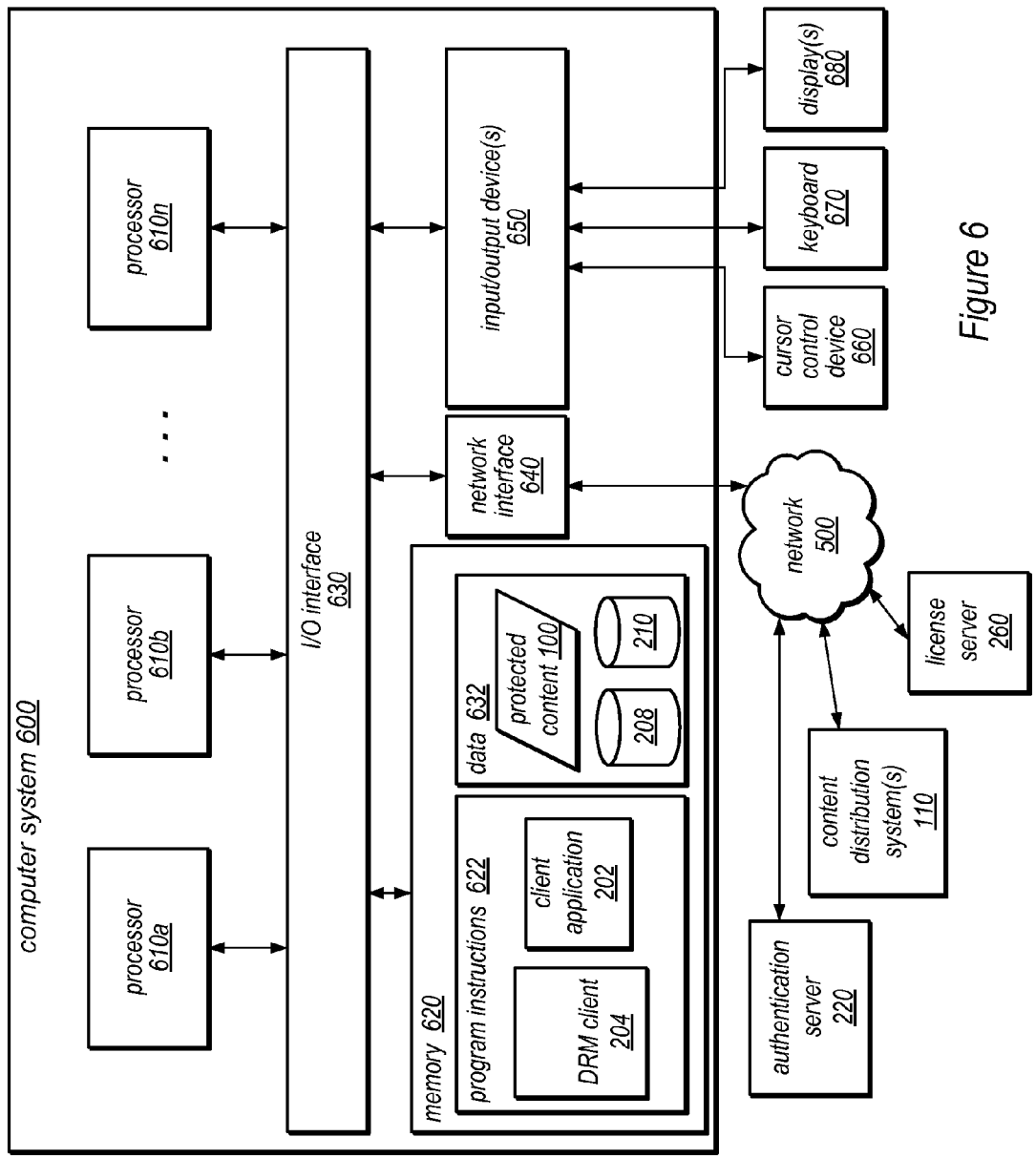
FIG. 6 illustrates an example computer system suitable for implementing various components of the system and method for digital rights management using a secure end-to-end protocol with embedded encryption keys.

In various instances, this detailed description may refer to a device on which content may be consumed. In various embodiments, such a device may include but is not limited to a computing system (such as a personal computer system, a desktop computer, a laptop, a notebook, a netbook, a mainframe computer system, a handheld computer, a workstation, or a network computer), an application server, a storage device, a digital audio or multimedia player (e.g., an MP3 player), a personal digital assistant (PDA), a mobile phone, a smartphone, an e-book reader, a digital photo frame, a camera, a camcorder, a set top box, a mobile device, a video game console, a handheld video game device, or any other device or system configured to access, view, read, write, and/or manipulate any of the content data described herein. Any of such devices may be implemented via a computer system similar to that described with respect to FIG. 6.

Note that in various instances the description presented herein may refer to a given entity performing some action. It should be understood that this language may in some cases mean that a system (e.g., a computer system) owned and/or controlled by the given entity is actually performing the action.

Introduction

Various embodiments of the system and method for digital rights management using a secure end-to-end protocol with embedded encryption keys may include a digital rights management (DRM) framework configured to provide access to protected content (e.g., content that is encrypted and/or subject to usage rights). The DRM framework may be configured to use the secure end-to-end protocol to protect communication between trusted endpoints within the DRM framework from unauthorized access or intrusion. An entity which is not a security threat to the integrity of the overall DRM system may be referred to herein as a "trusted" entity. As described in more detail below, the secure end-to-end protocol may be configured to transmit encrypted messages between trusted endpoints within the DRM framework.

In some embodiments, a client system configured to consume (e.g., view, play, etc.) protected content may not be considered a trusted endpoint. However, application software executing within the client system may be considered a trusted endpoint. In this case, encrypted messages transmitted to and from the client system within the DRM framework may remain encrypted while traveling through the network interface and operating system (OS) of the client system. The encrypted messages may be in a clear, unprotected state only during execution of the messages by the trusted application software executing on the client system. Specifically, in some embodiments, access to unencrypted versions of the messages may only be granted to the trusted application software executing within the client system. In such a case, the messages may be protected from unauthorized access or tampering while traveling through the network interface and OS of the client system. In some embodiments, the application software executing on the client system may be configured to perform the encryption and decryption of messages transmitted across the secure end-to-end protocol. Application software executing on another system within the DRM framework may serve as another trusted endpoint and may also be configured to encrypt and decrypt messages for transmission over the secure end-to-end protocol. This instance of application software may communicate with the instance of the application software installed on the client system, thus forming a secure "tunnel" (i.e., a secure end-to-end protocol) through which messages are encrypted and, as such, protected from unauthorized access, during transmission between the software applications.

In various embodiments, the DRM framework may be configured to use the secure end-to-end protocol to control access to protected content and to enforce usage rights of the protected content. As described in more detail below, content protection within the DRM framework may include the coordinated efforts of multiple systems, including a system on which the consumption of content is attempted (e.g., a client system), an authentication server, a software build system and a license server configured to provide content licenses enabling the consumption of protected content. The client system may, in various embodiments, include a client application configured to consume (e.g., view, play, etc.) content. In some embodiments, the client application may implement a DRM client configured to carry out DRM operations (e.g. decrypting content and/or enforcing usage rules) such that the content can be consumed on the client system. One particular example of a DRM client includes Adobe® DRM Client for Flash® Player. The DRM client may be configured to communicate with the authentication server using the secure end-to-end protocol described above.

In various embodiments, elements of the DRM framework may be configured to perform a process that includes the authentication of a client application executing on a client system. In some embodiments, a DRM client may be implemented within the client application. The client application may be authenticated as a trusted endpoint within the DRM framework prior to the client application gaining access to protected content. In some embodiments, the DRM client implemented within the client application may be configured to communicate with the authentication server to authenticate the client application. The authentication process may be performed using the secure end-to-end protocol described above. For example, the DRM client implemented within the client application and the authentication server may both be configured to implement the secure end-to-end protocol. The DRM client and authentication server may exchange secure, encrypted messages throughout the authentication process. In some embodiments, messages exchanged between the DRM client and the authentication server may continue to be encrypted by the DRM client and the authentication server subsequent to authentication of the DRM client.

The encrypted messages transmitted between the DRM client and the authentication server may be encrypted using an encryption key specific to the instance of the DRM client implemented within the client application. As described in more detail below, the DRM framework may be configured to perform DRM client diversification by generating multiple versions of the DRM client that are functionally equivalent, but have different binary representations. For example, the different DRM client versions may be created by embedding different encryption keys into the binary representations of the multiple DRM client versions. As described in more detail below, the encryption key may be embedded within the binary representation of the DRM client during the software build process of the DRM client. The DRM client may be configured to use the embedded encryption key to encrypt and decrypt messages sent and received, respectively, by that particular DRM client. In some embodiments, the authentication server may maintain a stored record of the encryption keys embedded in different instances of the DRM client. The authentication server may be configured to use a particular encryption key corresponding to a particular DRM client in order to encrypt messages sent to the particular DRM client and decrypt messages received from the particular DRM client.

In some embodiments, the DRM client may be configured to initiate the authentication process for the client application. For example, the DRM client may send an encrypted (using the particular encryption key embedded within the DRM client, as described above) authentication request to the authentication server on behalf of the client application. In some embodiments, the DRM client may be configured to determine the authentication mechanism required by the authentication server. Some examples of authentication mechanisms that may be used in various embodiments include, but are not limited to, username/password, smartcard authentication, or Kerberos credentials. Dependent on the determined authentication mechanism, the DRM client may be configured to generate an encrypted authentication request including the required authentication credentials of the client application.

In some embodiments, the authentication server may be configured to receive and decrypt (using the encryption key associated with the particular DRM client) the authentication request received from the DRM client. The authentication server may be configured to validate the authentication credentials sent by the DRM client. For example, the authentication server may compare the authentication credentials to a stored repository of client application information. In response to determining that the authentication credentials of a client application, as sent by a DRM client on behalf of the client application, are valid, the authentication server may identify the client application as a trusted consumer of protected content. In some embodiments, the authentication server may be configured to send an authentication token to the DRM client implemented within the client application. The authentication token may be stored on the client system on which the client application is running and may be used by the client application as proof that the identity of the client application has been validated by a trusted party and that the client application is a trusted consumer of protected content.

In some embodiments, the authentication process may be implemented as a single sign-on process within the DRM framework, as described in further detail below. For example, a client application authenticated with a single authentication server may be granted access to resources at multiple service providers. The client application may be provided an authentication token by the authentication server, subsequent to the authentication server validating the client application as a trusted consumer of protected content, as described above. In various embodiments, different types of authentication tokens may be used within the DRM framework. For example, the authentication token may be a Security Assertion Markup Language (SAML) token. As described in more detail below, the SAML token may be used to enable the single sign-on process for the client application.

The client application, via the DRM client implemented within the client application, may present the authentication token in future messages sent to the authentication server and also in requests to other service providers within the DRM framework. In some embodiments the authentication token may serve to validate the client application as a trusted consumer of protected content. In this case, the client application may present the authentication token instead of presenting authentication credentials. As such, the client application is only required to "sign-in" (i.e., present authentication credentials for identity verification) one time, with the authentication server, as described above. Transmitting the authentication credentials one time in a single sign-on process may, in some embodiments, result in the authentication credentials being less vulnerable to attack by untrusted entities monitoring communications within the DRM framework. For example, the authentication token may not include passwords or other sensitive authentication information and, thus, may eliminate further transmission of sensitive authentication information from the client application while the authentication token is valid.

The authentication token obtained by the client application may be utilized to obtain access to protected content. For instance, the client system may obtain protected content from a variety of sources such as in an attachment to email or directly from an e-commerce portal. To obtain the content license providing unprotected access to a particular piece of protected content, the client application may be configured to submit a license request to a license server. The license request may, in various embodiments, include at least a portion of the authentication token described above. In various embodiments, the authentication token may indicate that a trusted party (e.g., the authentication server) has validated the client application as a trusted consumer of protected content. The license request may include other information (e.g., a username or other user identifier, a content identifier of the content for which a license is requested, etc.) as described in more detail below. The license server may be configured to perform one or more verifications on which the issuance of a content license is dependent. For instance, the license server may ensure that the client system is not on a machine revocation list (e.g., a list that identifies systems whose authentication token has expired or systems known to be security threats or otherwise unsuitable for receiving a content license).

In various embodiments, the secure end-to-end protocol described above may be designed according to Representational State Transfer (REST) guidelines. REST guidelines define a particular usage model for Web standards (e.g., Hypertext Transfer Protocol [HTTP] and Uniform Resource Identifiers [URIs]) and provide a means for designing a protocol that may seamlessly interface with the existing architecture of the World-Wide Web (WWW). In other embodiments, other design guidelines and/or protocols may be employed for the secure end-to-end protocol. For example, the secure end-to-end protocol may be implemented using the Secure Sockets Layer (SSL) protocol traditionally used to secure communication via the WWW. In this case, communication messages may be encrypted twice: once with SSL encryption and again with the secure end-to-end encryption protocol described above.

Secure End-to-End Protocol

FIG. 1 illustrates a block diagram of a system configured to implement a DRM framework which provides access to protected content. In various embodiments, the DRM framework may implement a secure end-to-end protocol with embedded encryption keys. In some embodiments, client system 200 may receive one or more portions of protected content 100 from a content distribution system 110. Note that client system 200 may, in various embodiments, obtain protected content 100 from other sources (e.g., as an attachment to email, directly from an e-commerce portal, etc.). In some embodiments, client system 200 may include client application 202, configured to consume (e.g., view, play, etc.) protected content 100. Note that FIG. 1 is provided as an example of a DRM framework and that other embodiments are possible, with various modules of FIG. 1 combined together or separated into additional modules.

Client system 200 may, in various embodiments, include DRM client 204 configured to carry out DRM operations (e.g. decrypting content and/or enforcing usage rules) such that protected content 100 can be consumed by client application 202. In some embodiments, DRM client 204 may be implemented within client application 202 and may be configured to carry out DRM operations on behalf of client application 202. In various embodiments, DRM client 204 may be configured to communicate with other elements of the DRM framework, on behalf of client application 202, using a secure end-to-end protocol. For example, DRM client 204 may be configured to communicate with authentication server 220 using a secure end-to-end protocol. As described above, the secure end-to-end protocol may include protecting messages sent between trusted endpoints by encrypting and decrypting the messages within software applications executing on each trusted endpoint.

As illustrated in FIG. 1, DRM client 204 and authentication server 220 may communicate via request(s) 252 and response(s) 254. In some embodiments, authentication server 220 may include DRM server 222, which may be implemented as a trusted software application configured to communicate with DRM client 204 via the secure end-to-end protocol. DRM server 222 and DRM client 204 may both function as trusted endpoints within the DRM framework of the system illustrated in FIG. 1. Messages sent between DRM server 222 and DRM client 204 using the secure end-to-end protocol may remain encrypted, and, as a result, protected from unauthorized access, during transmission between the software applications. Specifically, messages sent from DRM client 204 to DRM server 222 may be encrypted by DRM client 204 and decrypted by DRM server 222. In a similar manner, messages sent from DRM server 222 to DRM client 204 via may be encrypted by DRM server 222 and decrypted by DRM client 204. As a result, a secure "tunnel" (i.e., a secure end-to-end protocol) may be formed, as messages sent between DRM client 204 and DRM server 222 may travel in an encrypted state. Encrypting the messages in this manner may protect the messages from being deciphered by an attacker or other entity monitoring communications between client system 100 and authentication server 220. The messages may also be protected from an attacker or other entity monitoring communications within client system 100 or authentication server 220, as the messages remain encrypted while being transmitted between the DRM software applications of the client system and the authentication server (i.e., DRM client 204 and DRM server 222). Specifically, the messages remain encrypted while passing through the network interface and operating system of both DRM client 204 and DRM server 222.

In some embodiments, encryption key 206 illustrated in FIG. 1 may be used to encrypt messages sent between DRM client 204 and DRM server 222. As described in further detail below, encryption key 206 may be embedded into the binary representation of DRM client 204. DRM client 204 may be configured to encrypt messages sent to DRM server 222 and decrypt messages received from DRM server 222 using encryption key 206. Encryption key 206 may also be stored in an encryption key map accessible by authentication server 220. For example, encryption key map 224 shown in FIG. 1 may map identifiers corresponding to specific installed instances of a DRM client to the encryption keys embedded within the specific installed instances of the DRM client. As described below, authentication server 220 may be configured to identify DRM client 204 using a particular identifier sent by DRM client 204. Authentication server 220 may use the identifier sent by DRM client 204 to look-up the appropriate encryption key 206 corresponding to DRM client 204 in encryption key map 224. DRM server 222 may use the retrieved encryption key to encrypt messages sent to DRM client 204 and decrypt messages received from DRM client 204.

As described above, encryption key 206 may be used as a symmetric key for the encryption of messages sent between a DRM client and a DRM server, as both the DRM client and DRM server use the same encryption key (i.e., encryption key 206) for message encryption. In some embodiments, DRM client 204 and DRM server 222 may be configured to use the Advanced Encryption Standard (AES) to encrypt and decrypt messages using encryption key 206. In other embodiments, other encryption algorithms may be used. While the example above describes the use of a symmetric encryption key for the secure end-to-end protocol, different encryption key mechanisms may be used in other embodiments. For example, DRM client 204 and DRM server 222 may be configured to use a public-private key pair for message encryption.

In various embodiments, authentication server 220 may be configured to verify the identity of an entity requesting access to protected content. Authentication server 220 may be configured to grant or deny protected content access to a requesting entity dependent on whether the entity is determined to be a trusted consumer of protected content. An entity that has been verified by authentication server 220 as a trusted consumer of protected content may be said to be authenticated. In various embodiments, DRM client 204 may communicate with authentication server 220 on behalf of client application 202. For example, DRM client 204 may use the secure end-to-end protocol to communicate with authentication server 220 in order to authenticate client application 202 as a trusted consumer of protected content 100. Subsequent to being authenticated as a trusted consumer of protected content 100, client application 202 may gain access to protected content 100.

In some embodiments, DRM client 204 may be configured to initiate authentication of client application 202 by sending a request 252 to DRM server 222. For example, DRM client 204 may be configured to initiate the authentication process by sending an encrypted request to DRM server 222 to determine the type of authentication mechanism required by authentication server 220 for authentication of client application 202. In some embodiments, DRM client 204 may encrypt the authentication mechanism request using encryption key 206 embedded within DRM client 204, as described above.

In some embodiments, DRM client 204 may also include an identification header in the authentication mechanism request. The identification header may include an identifier, as described above, identifying the specific instance of DRM client 204 that is installed on client system 200. In some embodiments, the identification header may also include the version of the secure end-to-end protocol being used by DRM client 204. The identification header may be sent as an unencrypted portion of the authentication mechanism request, which may allow authentication server 220 to determine the particular instance of the DRM client 204 from which the request was sent. In some embodiments, authentication server 220 may extract the identifier from the identification header sent by DRM client 204. Authentication server 220 may then search encryption key map for an entry matching the identifier sent by DRM client 204. Upon finding a matching entry in encryption key map 224, authentication server 220 may be configured to provide the encryption key contained in the matching entry to DRM server 222. The encryption key located by authentication server 220 and provided to DRM server 222 may, in some embodiments, be equivalent to encryption key 206 embedded in DRM client 204. DRM server 222 may be configured to decrypt the message received from DRM client 204 using the encryption key provided by authentication server 220. In some embodiments, if authentication server 220 fails to find a matching identifier in the encryption key map, authentication server 220 may be configured to send a message to DRM client 204 indicating that the authentication request has been denied.

In various embodiments, authentication server 220 may use different types of authentication mechanisms for authenticating an entity requesting access to protected content. Some examples of authentication mechanisms that may be used by authentication server 220 in various embodiments are username and password, smartcard authentication, or Kerberos credentials. For example, authentication server 220 may require the username and password of user accessing protected content via client application. As another example, authentication server 220 may require Kerberos credentials obtained from another trusted third party entity. In other embodiments, different types of authentication mechanisms and criteria may be used by authentication server 222.

In response to the authentication mechanism request sent by DRM client 204, authentication server 220 may be configured to generate a response containing information regarding the particular authentication mechanism required by authentication server 220. For example, authentication server 220 may create a list of authentication credentials that must be received by authentication server 220 in order to authenticate a client application. In some embodiments, authentication server 220 may provide the list of authentication credentials to DRM server 222 for encryption. DRM server 222 may use the same key used to decrypt the message from DRM client 204 to encrypt the message containing the list of required authentication credentials. DRM server 222 may send the encrypted response to DRM client 204 via response 254, as illustrated in FIG. 1.

In some embodiments, DRM client 204 may receive the encrypted response from DRM server 222 via response 254. DRM client 204 may be configured to decrypt the response using encryption key 206. In some embodiments, DRM client 204 may be configured to generate an authentication request, dependent on the list of authentication credentials included in the response from DRM server 222. For example, if authentication server 220 requires a username and password for authentication, DRM client 204 may generate an authentication request including the username and password of a user accessing protected content via client application 202. As another example, if authentication server 220 requires Kerberos credentials, DRM client may be configured to generate an authentication request including the Kerberos credentials of client application 202. In some embodiments, DRM client 204 may be configured to include the required authentication information in an authentication header as at least a portion of the authentication request sent to authentication server 220. DRM client 204 may be configured to encrypt (using encryption key 206) the authentication request, including the authentication header, and send the request to DRM server 222 via request 252.

In response to the authentication request sent by DRM client 204, authentication server 220 may be configured to verify the identity of DRM client 204 to determine whether DRM client 204 may be authenticated as a trusted consumer of protected content. For example, DRM server 220 may decrypt the authentication request received from DRM client 204 using the corresponding encryption key located in encryption key map 224, as described above. DRM server 222 may provide the decrypted authentication credentials to authentication server 220 for validation. In some embodiments, authentication server 220 may compare the authentication credentials included in the authentication request from DRM client 204 to a stored repository of client application information (e.g., client information 228).

Subsequent to determining that the authentication credentials sent by DRM client 204 match the stored authentication credentials for client application 202, authentication server 220 may be configured to generate an authentication token (e.g., authentication token 208) for client system 200. In some embodiments, DRM server 222 may be configured to encrypt the authentication token using the encryption key corresponding to DRM client 204 located in encryption key map 224. DRM server 222 may send the encrypted authentication token to DRM client 204. In some embodiments, if authentication server 220 fails to match the authentication credentials received from DRM client 204 to the stored authentication credentials for client application 202, or fails to find any stored authentication credentials for client application 202, authentication server 220 may be configured to send a message to DRM client 204 indicating that the authentication request has been denied.

DRM client 204 may be configured to, in some embodiments, receive and decrypt (using encryption key 206) authentication token 208 on behalf of client application 202. As illustrated in FIG. 1, authentication token 208 may be stored on client system 100. In some embodiments, authentication token 208 may serve as a session identification token for client system 200. Client system 200, via DRM client 204, may be configured to use authentication token 208 in further communication with other entities of the DRM framework. For example, DRM client 204 may be configured to include the authentication token in a message sent to a server within the DRM framework as proof that client system 100 has been authenticated (by a trusted party) as a trusted consumer of protected content. For example, as described in more detail below, DRM client 204 may present the authentication token to license server 260 as part of a request for a license to view protected content.

In some embodiments, the authentication token received by a DRM client may be a Security Assertion Markup Language (SAML) token. A SAML token may be configured to enable a single sign-on process for the DRM client. For example, a DRM client that has received a SAML token via authentication with an authentication server may be configured to use the SAML token to obtain services from multiple service providers without executing an additional sign-on process with the service providers. The DRM client may be required to sign-on (i.e., complete the authentication process) with the authentication server in order to receive the SAML token. However, for future communication with the authentication server and for service requests from various service providers, the DRM client may be configured to present only the SAML token as proof of identity. The authentication server and other service providers within the DRM framework may require only the SAML token from the DRM client, rather than another sign-on procedure. In other embodiments, a service provider from which the DRM client has requested service may receive the SAML token from the authentication server when the DRM client requests access to a service.

Transmitting the authentication credentials one time in a single sign-on process may, in some embodiments, result in the authentication credentials being less vulnerable to attack by untrusted entities monitoring communications within the DRM framework. For example, the SAML token may not include passwords or other sensitive authentication information and, thus, may eliminate further transmission of sensitive authentication information from the client application while the SAML token is valid. In other embodiments, the authentication token may be a type of token other than a SAML token.

In some embodiments, an authentication server may be configured to revoke an authentication token issued to a DRM client dependent on the status of the authentication token. For example, authentication token 208 may have an associated expiration date beyond which the authentication token is no longer valid. As another example, authentication server 220 may determine that authentication token 208 was issued to DRM client 204 using an obsolete version of the secure end-to-end protocol and, as such, the authentication token is no longer valid. In response to determining that an authentication token is no longer valid, an authentication server, in some embodiments, may be configured to place the authentication token on a revocation list (e.g., revocation list 226) maintained by the authentication server. In some embodiments, a revocation list may be a list that identifies systems whose authentication token has expired or systems known to be security threats or otherwise unsuitable for receiving a content license.

In some embodiments, an authentication token that has been placed on a revocation list may not be honored as proof of DRM client identity by the authentication server or by other servers within the DRM framework. For example, authentication server 220, in response to receiving a request from DRM client 204 containing authentication token 208, may verify that authentication token 208 is not on revocation list 226 before honoring the request from DRM client 204. Other servers within the DRM framework may have access to the revocation list maintained by the authentication server. In some embodiments, a server with access to revocation list 226 may verify that authentication token 208 presented by DRM client 204 is not present on revocation list 226 before granting access to protected content to DRM client 204. For example, a request from DRM client 204 to license server 260 to view protected content 100 may be denied if license server 260 determines that authentication token 208 presented by DRM client 204 is included on revocation list 226.

In various embodiments, an authentication token may be placed on a revocation list for a variety of reasons including, but not limited to, expiration of the authentication token, installation of a new version of client application on the client system, or in response to a determination that the authentication token has been compromised during an unauthorized access to the client system. In some embodiments, authentication server 220 may send a request for re-authentication to DRM client 204 subsequent to determining that the authentication token currently in use by DRM client 204 has been revoked. In other embodiments, authentication server 220 may inform DRM client of the need for re-authentication in response to a next request or communication message received from DRM client 204.

Embedded Encryption Key

In various embodiments, the DRM framework may also be configured to perform DRM client diversification. In various embodiments, diversifying a DRM client may include generating multiple versions of the same DRM client (e.g., DRM client 204), such as multiple versions that will be deployed onto different client systems (e.g., over the Internet or some other network), such as client system 200. Each of such DRM client versions may, in various embodiments, be functional equivalents (e.g., each may be capable of performing the same functionalities in the same manner when executed on a computer system) but may differ in other respects. For example, diversifying a DRM client may include generating multiple DRM client versions that include different encryption keys, such as DRM encryption key 206. In this way, each DRM client version may, in various embodiments, be configured to operate in the same manner; however, the stored representation (e.g., a binary representation stored in memory) of a given DRM client version may be different than the stored representation of another DRM client version. This difference may, in various embodiments, be caused by the inclusion of different encryption keys in different versions of the DRM client.

In various embodiments, different degrees of DRM client diversification may be utilized. In one embodiment, a highly diversified approach may be implemented. In one example of such an implementation, each DRM client that is deployed may include an encryption key that is different than all other encryption keys included within other DRM clients that are deployed. In some embodiments, a more relaxed diversification approach may be implemented. For instance, a particular quantity (e.g., a fixed or configurable quantity) of diversified versions may be generated and multiple instances of each version may be deployed. Such an implementation may, in various embodiments, cause the formation of multiple groups of DRM clients (e.g., each DRM client of a given group may include an encryption key that is the same as the encryption key of every other DRM client in that group, but different than the encryption keys of DRM clients of other groups).

In embodiments where diversification is utilized, a security breach of the encryption key for a particular DRM client would only affect the DRM clients that include the compromised encryption key. In various embodiments, other client systems that include different DRM client encryption keys would not be affected by such a security breach. Also note that in the event of a security breach of a DRM encryption key, any client system that includes a DRM client with that encryption key may obtain a new, secure DRM client with a new encryption key.

In some embodiments, diversifying a DRM client with an encryption key may include embedding the encryption key into the executable version (i.e., the binary representation) of the DRM client. For example, subsequent to converting the source code files of a DRM client into an executable file, build server 240 illustrated in FIG. 1 may create multiple copies of the executable DRM client file. In some embodiments, build server 240 may be configured to create these multiple copies by embedding an encryption key into each copy of the DRM client. For example, build server 240 may select an encryption key from encryption key pool 242 to include in a particular copy of DRM client 204. Build server 240 may be configured to use a variety of different algorithms, in various embodiments, to select a particular encryption key from encryption key pool 242. Examples of the algorithms used by build server 240 to select a particular encryption key may include, but are not limited to, random selection or round robin selection.

The number of encryption keys included in encryption key pool 242 may be dependent on the degree of DRM client diversification implemented. In some embodiments, to support a highly diversified implementation, encryption key pool 242 may include enough keys such that each DRM client that is deployed may include an encryption key that is different than all other encryption keys included within other DRM clients that are deployed. In other embodiments, encryption key pool 242 may include a particular quantity (e.g., a fixed or configurable quantity) of encryption keys to support a more relaxed diversification implementation in which a particular quantity of diversified DRM client versions are created and multiple instances of each version may be deployed.

The number of encryption keys included in an encryption key pool may be extended as necessary to increase the degree of DRM client diversification implemented within a DRM framework. In some embodiments, a change in the number of encryption keys included in an encryption key pool may include creating a new version of the secure end-to-end protocol. The new version of the secure end-to-end protocol may be installed on an authentication server (e.g., authentication server 220) and the authentication server may require that future communication with DRM clients adhere to the new protocol version. In this case, as described above, the authentication server may revoke the authentication token assigned to a client system using an obsolete version of the secure end-to-end protocol and require the client system to obtain a new installation of the DRM client. The new installation of the DRM client may be configured to use the new version of the secure end-to-end protocol and may also contain an encryption key from the new pool of encryption keys. In this case, the DRM client may be configured to complete a new authentication process with the authentication server and obtain a new authentication token. In other embodiments, in response to a change in the secure end-to-end protocol version, the authentication server may allow previously authenticated DRM clients to continue using a prior version of the secure end-to-end protocol and the authentication server may require the current version of the secure end-to-end protocol to be used for authentication of and communication with new DRM clients.

In some embodiments, the build server may also be configured to embed a unique identifier of an instance of a DRM client into the binary representation of the DRM client. In this case, the binary representation of a DRM client may include a unique identifier-encryption key pair. In some embodiments, this identifier-encryption key pair may be stored by the build server in an encryption key map (e.g., encryption key map 244). In some embodiments, the unique identifier embedded into the binary representation of a DRM client may be used to identify the particular instance of a DRM client that has been installed on a client system. As described above, the DRM client may send the identifier to an authentication server as part of a process to initiate authentication of the client application on a client system. In some embodiments, the authentication server may be configured to use the identifier to locate the encryption key corresponding to the DRM client in an encryption key map (e.g., encryption key map 224). In some embodiments, encryption key map 224 may receive updated identifier-encryption key pair information from encryption key map 244 and/or be synchronized with encryption key map 244.)

Content License Acquisition

The authentication token obtained by a client system from an authentication server may be utilized to obtain access to a content license. In some embodiments, the content license may be used to access a clear or unencrypted version of protected content (e.g., for consumption, such as video playback). For example, to obtain the content license for protected content 100, DRM client 204 may be configured to submit a license request 256 to license server 260. The license request may, in various embodiments, include at least a portion of authentication token 208. In various embodiments, the authentication token may indicate that a trusted party (e.g., authentication server 220) has verified the identity of client application 202 as a trusted consumer of protected content. The license request may include other information (e.g., a content identifier of the content for which a license is requested). In some embodiments this information may be obtained from metadata of protected content 100. In some embodiments, this metadata may not be encrypted as is the rest of protected content 100 (e.g., the actual content to be consumed).

The license server may be configured to perform one or more verifications on which the issuance of a content license for protected content 100 is dependent. For instance, license server 260 may ensure that the authentication token presented on behalf of client application 202 is not on revocation list 264. (Note that in some cases revocation list 264 may receive updated revocation information from revocation list 226 and/or be synchronized with revocation list 226.) In some embodiments, license server 260 may also be configured to ensure that the user is authorized to access the content. For example, client information 262 may contain a list of users and/or client systems that are authorized to access content. License server 260 may be configured to verify that the client application identified by authentication token 208 is authorized to access content by comparing the client application information included in authentication token 208 against client information 262. Client information 262 may include records of clients that have purchased or rented various content. In some cases, this information may be obtained from an e-commerce portal system that sells or rents content to various users and their associated client systems.

Subsequent to performing all of the appropriate verifications, license server 260 may provide the content license to client system 100 in response 258. License server 260 may identify the appropriate content license to provide at 258 by matching a content identifier (e.g., a content identifier of protected content 100) from request 256 to a content identifier associated with a particular content license. In some embodiments, the content license may include a set of usage rules (i.e., content permissions) for the content and a content key (i.e., an encryption key to unlock the protected content within the client system). In various embodiments, content license(s) obtained from license server 260 may be stored within client system 200 as content license(s) 210.

In various embodiments, DRM component 204 may access the content license and usage rules (if any) from the content license. DRM component may be configured to decrypt the corresponding content to enable unprotected access by client application 202. In some embodiments, client application 202 may be configured to consume (e.g., view, play, etc) the unprotected content. In one particular example, client application 202 may be Adobe® Flash® Player or Adobe® AIR®. If usage rules for the content are included in the content license, DRM component 204 may enforce restrictions set forth by those rules. For instance, the DRM component might allow access to the content during a particular period of time (e.g., a rental period) or restrict the actions (e.g., view, cut, copy, paste, etc.) that may be performed on the content.

REST Protocol

In various embodiments, the secure end-to-end protocol described above may be designed according to Representational State Transfer (REST) guidelines. REST guidelines define a particular usage model for Web standards (e.g., Hypertext Transfer Protocol [HTTP] and Uniform Resource Identifiers [URIs]) and provide a means for designing a protocol that may seamlessly interface with the existing architecture of the World-Wide Web (WWW). The guidelines for protocol design provided by REST may include, but are not limited to, using uniform interfaces between components, designing resources to respond to standard methods and using stateless interactions between resources.

In accordance with REST guidelines, the secure end-to-end protocol may, in some embodiments, use uniform interfaces between components. For example, information may be transferred between components in a standard format, rather than in a format that is specific to the requirements of a particular application. The secure end-to-end protocol may also comply with REST guidelines by configuring resources within the DRM framework (e.g., DRM client 204 and authentication server 220) to interact with other resources via standard methods. For example, applications executing within authentication server 220 may be configured to use standard HTTP methods. In this case, client systems within the DRM framework that are configured to use the HTTP protocol may be able to interact with the applications executing on authentication server 220. The secure end-to-end protocol may also comply with REST guidelines by using stateless interactions between resources. For example, each message sent between DRM client 204 and authentication server 220 may contain all of the information necessary for the message recipient to understand and fulfill the request. Specifically, authentication server 220 may be able to fulfill a request from DRM client 204 independent of any prior requests from DRM client 204 and authentication server 220 may not have to retain any sort of communication state for DRM client 204. As a specific example, authentication server 220 may be able to fulfill a request for authentication from DRM client 204 using the information contained in a single authentication request message received from DRM client 204.

In other embodiments, other design guidelines and/or protocols may be employed for the secure end-to-end protocol. For example, the secure end-to-end protocol may be implemented in addition to the Secure Sockets Layer (SSL) protocol traditionally used to secure internet communications. In this case, communication messages may be encrypted twice: once with SSL encryption and again with the secure end-to-end encryption protocol described above. As described above, SSL encryption may provide message encryption between the network cards of two entities communicating across a network path, while the secure end-to-end protocol may provide message encryption between applications executing on each of the communicating entities.

Example Method(s)

Figure 2:
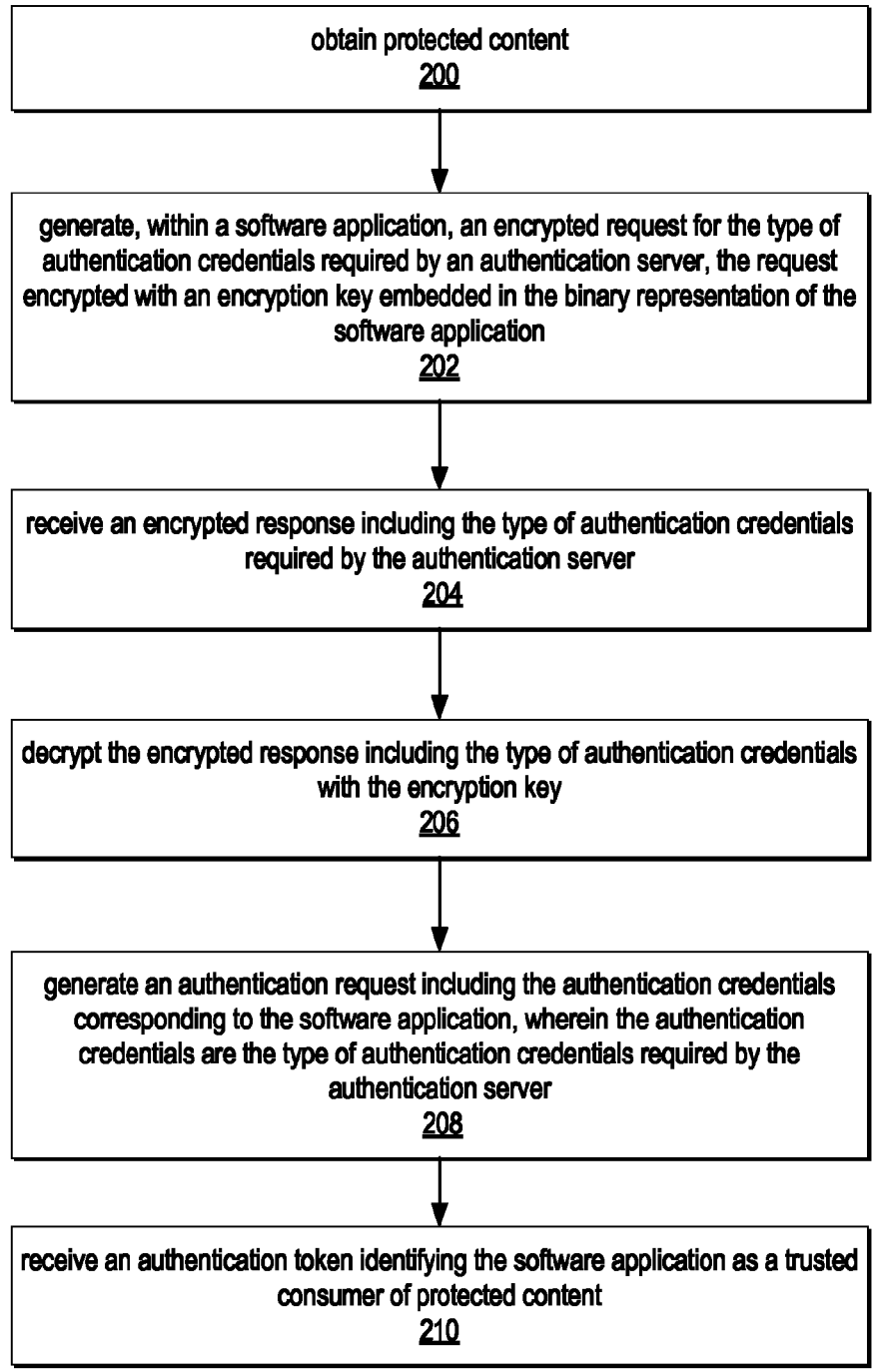
FIG. 2 illustrates a flowchart of an example method for authenticating a DRM client, according to various embodiments.

The system and method for digital rights management using a secure end-to-end protocol with embedded encryption keys may include various methods, including authenticating a DRM client, an example of which is illustrated by the flowchart of FIG. 2. In various embodiments, the illustrated method may be performed by DRM client 204 described above. As illustrated by block 200, the method may include obtaining protected content. In some embodiments, obtaining protected content may include obtaining protected content from a content distribution system, as described with respect to FIG. 1. As illustrated by block 202, the method may include generating, within a software application (e.g., client application 202), an encrypted request for the type of authentication credentials required by an authentication server (e.g., authentication server 220). The request may be encrypted with an encryption key embedded in the binary representation of the software application during the build of the software application, as described above. One example of such a request is described above with respect to request 252; the request may, in various embodiments, be sent to a DRM server (e.g., DRM server 222). As illustrated by block 204, the method may also include receiving an encrypted response including the type of authentication credentials required by the authentication server. One example of such a response is described above with respect to response 254. For example, the response may describe the type of authentication criteria required by authentication server 220.

As illustrated by block 206, the method illustrated in FIG. 2 may include using the embedded encryption key (e.g., encryption key 206). to decrypt the encrypted response including the type of authentication credentials. The method may also include, as illustrated by block 208, generating an encrypted authentication request including the authentication credentials corresponding to the software application, wherein the authentication credentials are the type of authentication credentials required by the authentication server. One example of generating such an encrypted authentication request is described above with respect to DRM client 204 generating request 252. For example, DRM client 204 may generate an authentication request including specific credentials corresponding to client system 200, as specified in the type of required authentication credentials received from DRM server 220. As illustrated by block 210, the method may include receiving an encrypted response including an authentication token. In some embodiments, the authentication token may identify the software application as a trusted consumer of protected content. One example of such an authentication token is described above with respect to authentication token 208.

Figure 3:
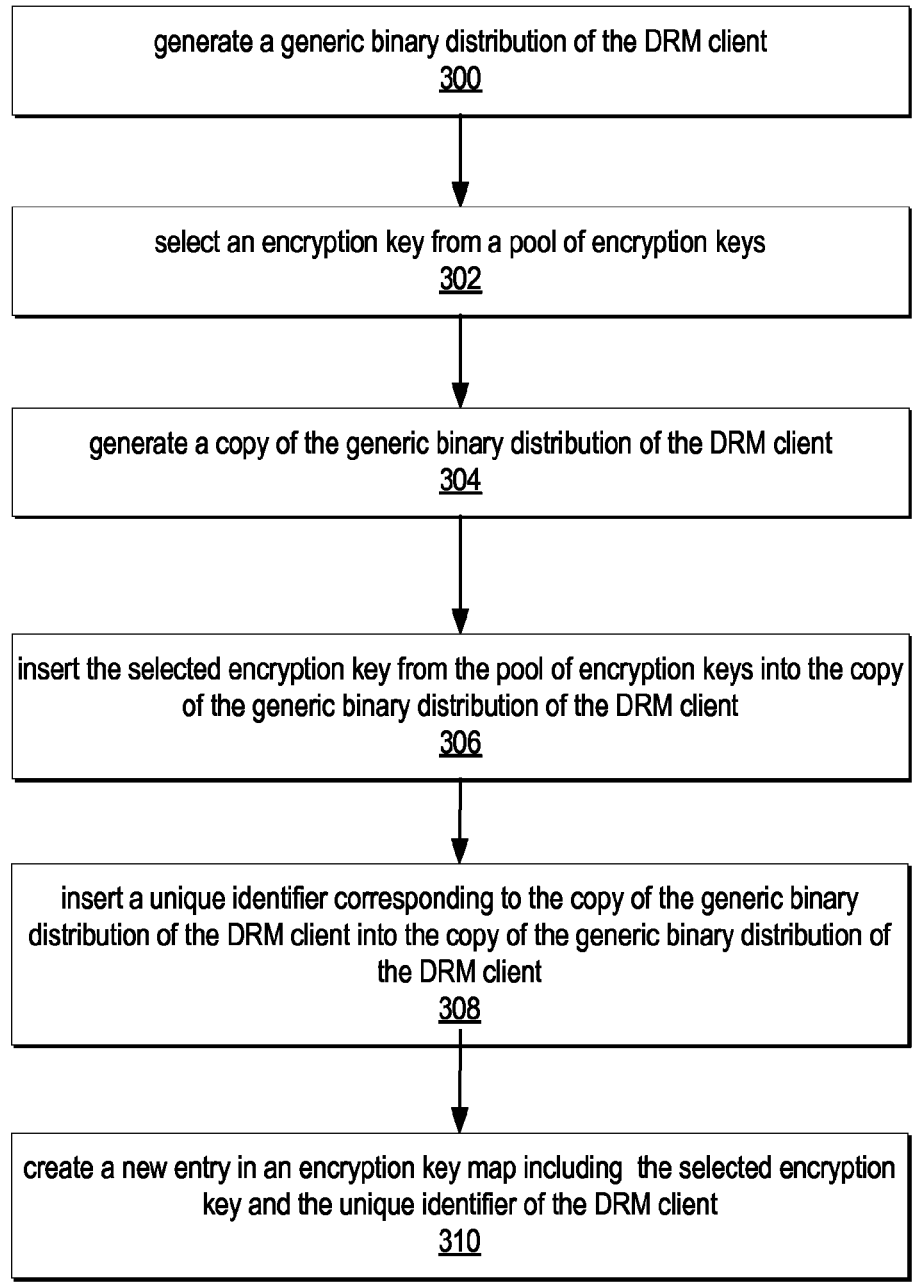
FIG. 3 illustrates a flowchart of an example method for generating a diversified version of a DRM client containing an embedded encryption key, according to various embodiments.

FIG. 3 illustrates a flowchart of an example method for generating a diversified version of a DRM client containing an embedded encryption key. In various embodiments, the illustrated method may be performed by build server 240 as described above. As illustrated by block 300, the method may include generating a generic binary distribution of the DRM client. For instance, as described above, build server 240 may be configured to convert the source code files of a DRM client into an executable file, thus creating a generic binary representation of the DRM client suitable for distribution to client systems. As illustrated by block 302, the method may include selecting an encryption key from a pool of encryption keys. Examples of selecting such an encryption key from an encryption key pool are described above with respect to encryption key pool 242.

As illustrated by block 304, the method may include generating a copy of the generic binary distribution of the DRM client. The method may further include, as illustrated by block 306, inserting the selected encryption key from the pool of encryption keys into the copy of the generic binary distribution of the DRM client. In some embodiments, the version of the generic binary distribution of the DRM client including the embedded encryption key may be considered a diversified version of the DRM client. One example of creating such a diversified version of the DRM client is described above with respect to build server 240. As illustrated by block 308, the method may include inserting a unique identifier corresponding to the copy of the generic binary distribution of the DRM client into the copy of the generic binary distribution of the DRM client. One example of inserting such a unique identifier is described above with respect to build server 240. The method illustrated by FIG. 3, may further include, as shown in block 310, creating a new entry in the encryption key map including the identifier of the DRM client and the selected encryption key. For instance, the identifier-encryption key pair may be stored in an encryption key map, such as encryption key map 244 described above.

Figure 4:
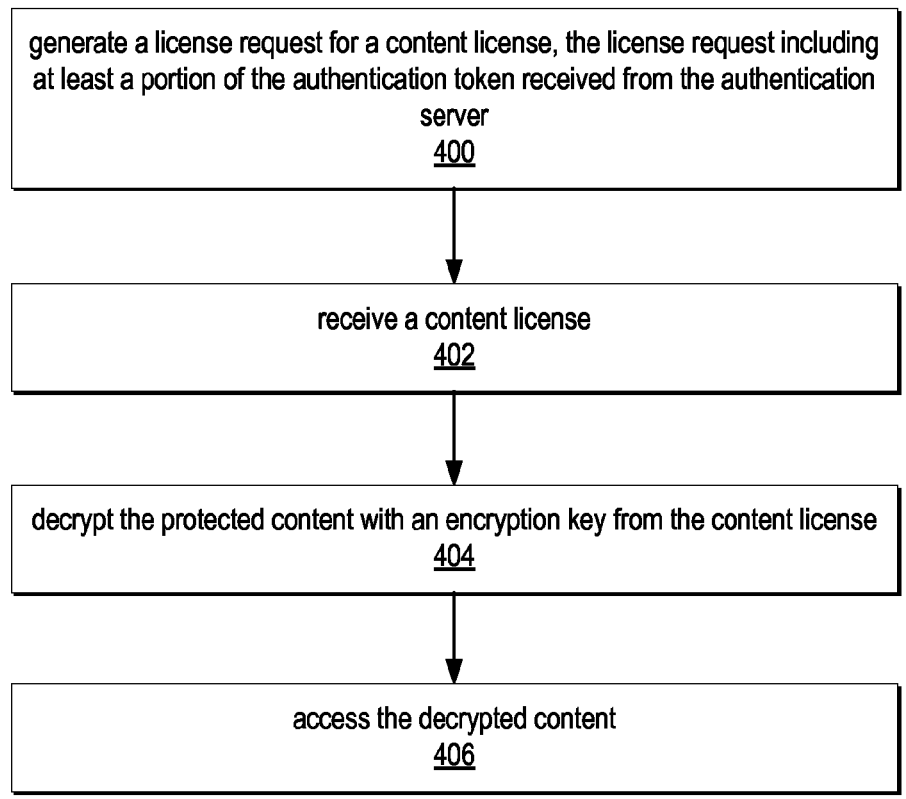
FIG. 4 illustrates a flowchart of an example method for obtaining a content license for accessing protected content, according to various embodiments.

FIG. 4 illustrates a flowchart of an example method for obtaining a content license for accessing protected content. In various embodiments, the illustrated method may be performed by DRM client 204 as described above. As illustrated by block 400, the method may include generating a license request for a content license. In some embodiments, the license request may include at least a portion of the authentication token received from the authentication server. One example of generating such a license request is described above with respect to license request 256. As illustrated by block 402, the method may include receiving a content license, as described above in regard to response 258. In some embodiments, the content license may be used to access a clear or unencrypted version of protected content (e.g., for consumption, such as video playback). The method illustrated in FIG. 4 may further include, as shown in 404, decrypting the protected content with an encryption key from the content license. As illustrated by block 406, the method may also include accessing the decrypted content.

Example System Configuration

Figure 5:
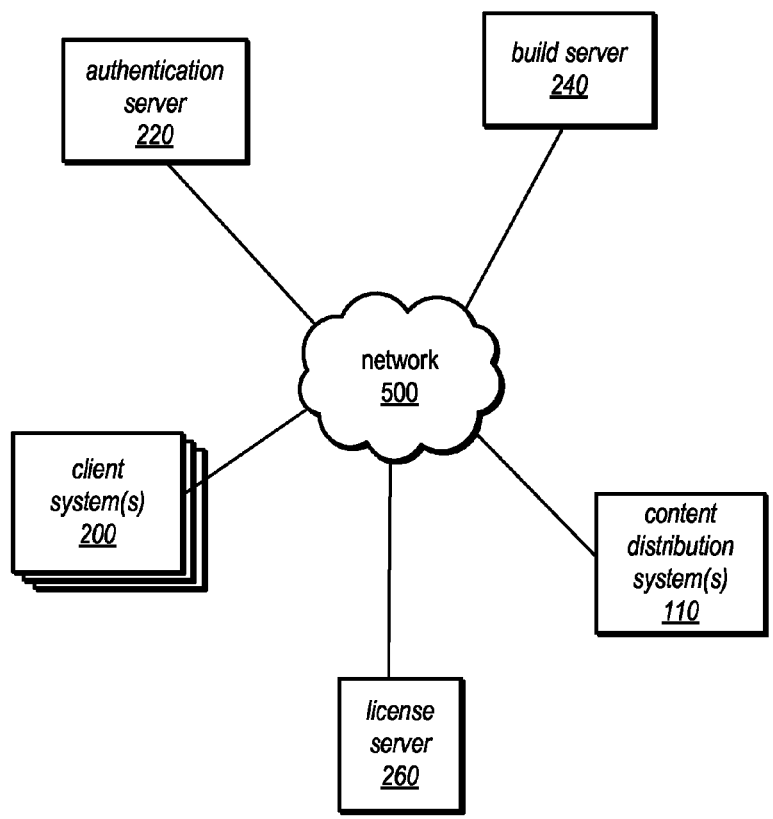
FIG. 5 illustrates an example system configuration for the digital rights management system, according to various embodiments.

Various embodiments of the system and method for digital rights management using a secure end-to-end protocol with embedded encryption keys may be configured according to different system configurations. One example of such a system configuration is illustrated by the system of FIG. 5. In the illustrated embodiment, each of the elements of the DRM framework described above are implemented as elements of respective computer systems. Each of the illustrated computer systems may, in various embodiments, communicate via a network, such as network 500. Network 500 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, each illustrated element may be a computer system configured to implement the respective components described above via hardware and/or software. Note that any of the elements illustrated in FIG. 5 may be implemented via one or more computer systems, such as the example computer system described below with respect to FIG. 6.

Example Computer System

Various embodiments of a system and method for digital rights management using a secure end-to-end protocol with embedded encryption keys, as described herein, may be executed on one or more computer systems, which may interact with various other devices. One such computer system is computer system 600 illustrated by FIG. 6, which may, in various embodiments, implement any of the elements illustrated in FIGS. 1-5. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

Computer system 600 may be configured to implement a DRM client 204 and/or a client application 202, which may be stored in memory as processor-executable program instructions 622. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some embodiments, it is contemplated that embodiments may be implemented using a single instance of computer system 600, while in other embodiments multiple such systems, or multiple nodes making up computer system 600, may be configured to host different portions or instances of various embodiments. For example, in one embodiment, some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x66, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, data 632 may include protected or unprotected content as described above (e.g., protected content 100) as well as authentication token 208 and content licenses 210. In various embodiments, program instructions 622 may be executable by the processor(s) to implement DRM client 204 and/or client application 202. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the DRM framework (as described above), may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 500), such as other computer systems (e.g., authentication server 220, content distribution system 110, license server 260, and/or build server 240), or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by FIGS. 2-4. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium. Accordingly, the embodiments described herein may be practiced with other computer system configurations.

Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A computer-implemented method, comprising:
generating, by a digital rights management (DRM) client, an encrypted request to authenticate a client application as a trusted consumer of protected content, the DRM client implemented within the client application, the client application configured to consume content, the request encrypted using an encryption key embedded within a binary representation of the DRM client, the encryption key having been selected from a pool of encryption keys and embedded by a software vendor during a build of the binary representation of the DRM client and being different than one or more encryption keys embedded within one or more other binary representations of the DRM client;
providing, by the DRM client, the encrypted request to an authentication server;
receiving, by the DRM client, an encrypted response from the authentication server, the authentication server being remote from the DRM client and using a particular encryption key corresponding to the encryption key of the DRM client to decrypt the encrypted request and to encrypt the encrypted response, the encrypted response including an authentication token;
decrypting, by the DRM client, the encrypted response; and
enabling the client application via the DRM client to consume the protected content based at least in part on the authentication token.

2. The method of claim 1, wherein:
the encrypted request comprises a request for a type of authentication credentials required by the authentication server to authenticate an identity of the DRM client; and
the encrypted response comprises the type of authentication credentials required by the authentication server to authenticate the identity of the DRM client.

3. The method of claim 2, further comprising, subsequent to said decrypting:
generating an authentication request comprising the authentication credentials corresponding to the DRM client, wherein the authentication credentials are the type of authentication credentials required by the authentication server; and
receiving the authentication token, wherein the authentication token identifies the client application as the trusted consumer of protected content.

4. The method of claim 3, further comprising:
generating a license request for a content license, wherein the license request comprises at least a portion of the authentication token received from the authentication server;
receiving, from a license server, the content license, wherein the content license provides unprotected access to a particular piece of protected content;
decrypting the protected content with an encryption key from the content license; and
accessing the decrypted content.

5. The method of claim 3, wherein the authentication credentials comprise:
a username and a password;
smartcard authentication credentials; or
Kerberos credentials.

6. The method of claim 3, wherein the authentication token is a Security Assertion Markup Language (SAML) token.

7. The method of claim 1, wherein the encryption key comprises a symmetric key or a key from a public-private key pair.

8. The method of claim 1, wherein said generating and said receiving comply with a protocol designed according to Representational State Transfer (REST) design guidelines.

9. A system, comprising:
a processor; and
a memory having program instructions stored thereon, that when executed by the processor, cause the processor to implement a digital rights management (DRM) client within a client application, configured to:
generate, within the client application, the client application configured to consume content, an encrypted request to authenticate the client application as a trusted consumer of protected content using an encryption key, the encryption key having been selected from a pool of encryption keys and embedded within a binary representation of the DRM client by a software vendor during a build of the binary representation of the DRM client and being different than one or more encryption keys embedded within one or more other binary representations of the DRM client;
provide, by the DRM client, the encrypted request to an authentication server;
receive, by the DRM client, an encrypted response from the authentication server, the authentication server being different from the DRM client and using a particular encryption key corresponding to the encryption key of the DRM client to decrypt the encrypted request and to encrypt the encrypted response, the encrypted response including an authentication token;
decrypt, using the DRM client, the encrypted response; and
enable the client application via the DRM client to consume the protected content based at least in part on the authentication token.

10. The system of claim 9, wherein:
the encrypted request comprises a request for a type of authentication credentials required by the authentication server to authenticate an identity of the DRM client; and
the encrypted response comprises the type of authentication credentials required by the authentication server to authenticate the identity of the DRM client.

11. The system of claim 10, wherein the DRM client is further configured to, subsequent to said decrypting:
generate an authentication request comprising the authentication credentials corresponding to the DRM client, wherein the authentication credentials are the type of authentication credentials required by the authentication server; and
receive the authentication token, wherein the authentication token identifies the client application as the trusted consumer of protected content.

12. The system of claim 11, wherein the DRM client is further configured to:
generate a license request for a content license, wherein the license request comprises at least a portion of the authentication token received from the authentication server;
receive, from a license server, the content license, wherein the content license provides unprotected access to a particular piece of protected content;
decrypt the protected content using an encryption key from the content license; and
access the decrypted content.

13. The system of claim 11, wherein the authentication credentials comprise:
a username and a password;
smartcard authentication credentials; or
Kerberos credentials.

14. The system of claim 11, wherein the authentication token is a Security Assertion Markup Language (SAML) token.

15. The system of claim 9, wherein the encryption key comprises a symmetric key or a key from a public-private key pair.

16. A non-transitory computer-readable storage medium having program instructions stored thereon that when executed by a computer, cause the computer to implement a DRM client within a client application, configured to:
generate, within the client application, the client application configured to consume content, an encrypted request to authenticate the client application as a trusted consumer of protected content using an encryption key embedded within a binary representation of the DRM client, the encryption key having been selected from a pool of encryption keys and embedded by a software vendor during a build of the binary representation of the DRM client and being different than one or more encryption keys embedded within one or more other binary representations of the DRM client;

provide, by the DRM client, the encrypted request to an authentication server;

receive, at the DRM client, an encrypted response from the authentication server, the authentication server being remote from the DRM client and using a particular encryption key corresponding to the encryption key of the DRM client to decrypt the encrypted request and to encrypt the encrypted response, the encrypted response including an authentication token;

decrypt, using the DRM client, the encrypted response; and enable the client application via the DRM client to consume the protected content based at least in part on the authentication token.

17. The computer-readable storage medium of claim 16, wherein:

the encrypted request comprises a request for a type of authentication credentials required by the authentication server to authenticate an identity of the DRM client; and the encrypted response comprises the type of authentication credentials required by the authentication server to authenticate the identity of the DRM client.

18. The computer-readable storage medium of claim 17, wherein the DRM client is further configured to, subsequent to said decrypting:

generate an authentication request comprising the authentication credentials corresponding to the DRM client, wherein the authentication credentials are the type of authentication credentials required by the authentication server; and receive the authentication token, wherein the authentication token identifies the client application as the trusted consumer of protected content.

19. The computer-readable storage medium of claim 18, wherein the DRM client is further configured to:

generate a license request for a content license, wherein the license request comprises at least a portion of the authentication token received from the authentication server;

receive, from a license server, the content license, wherein the content license provides unprotected access to a particular piece of protected content;

decrypt the protected content with an encryption key from the content license; and access the decrypted content.

20. The computer-readable storage medium of claim 18, wherein the authentication credentials comprise:

a username and a password;

smartcard authentication credentials; or

Kerberos credentials.

21. The computer-readable storage medium of claim 18, wherein the authentication token is a Security Assertion Markup Language (SAML) token.

22. The computer-readable storage medium of 16, wherein the encryption key comprises a symmetric key or a key from a public-private key pair.

23. A computer-implemented method, comprising:

receiving, by a server software application, a plurality of encrypted requests to authenticate a client application as a trusted consumer of protected content from a plurality of digital rights management (DRM) clients, wherein each of the plurality of encrypted requests includes an unencrypted portion comprising a unique identifier and an encryption key corresponding to a binary representation of a DRM client that sent the encrypted request, the unique identifier and the encryption key, the encryption key having been selected from a pool of encryption keys, having been embedded into the binary representation by a software vendor during a build of the binary representation of the DRM client;

for each encrypted request:

accessing, by the server software application, an encryption key map;

locating, using the encryption key map, an associated encryption key corresponding to the embedded unique identifier and encryption key;

decrypting, by the server software application, the encrypted request using the located associated encryption key;

providing, by the server software application to the plurality of DRM clients, an encrypted response that was encrypted using the associated encryption key, the encrypted response including an authentication token; and enabling the DRM client implemented within the client application to consume the protected content based at least in part on the authentication token, the client application configured to consume content.

24. The computer-implemented method of claim 1, wherein selecting from the pool of encryption keys includes utilizing a round robin selection algorithm.

25. The computer-implemented method of claim 1, wherein selecting from the pool of encryption keys includes utilizing a random selection algorithm.

26. The computer-implemented method of claim 1, wherein the encryption key is generated via a key derivation function.

* * * * *

UNITED STATES PATENT AND TRADEMARK OFFICE
CERTIFICATE OF CORRECTION

| | | |
|---|---|---|
| PATENT NO. | : 8,972,726 B1 | Page 1 of 1 |
| APPLICATION NO. | : 12/548143 | |
| DATED | : March 3, 2015 | |
| INVENTOR(S) | : Matthew J. Poling | |

It is certified that error appears in the above-identified patent and that said Letters Patent is hereby corrected as shown below:

In the Claims

Column 26, Claim 22, Line 4

Insert the word --claim-- right before the number 16

Signed and Sealed this
Fourteenth Day of July, 2015

Michelle K. Lee
*Director of the United States Patent and Trademark Office*